Jan. 12, 1954  S. S. BATTLES ET AL  2,665,781
METALLIC DOOR CONSTRUCTION
Filed Jan. 12, 1949  2 Sheets-Sheet 1
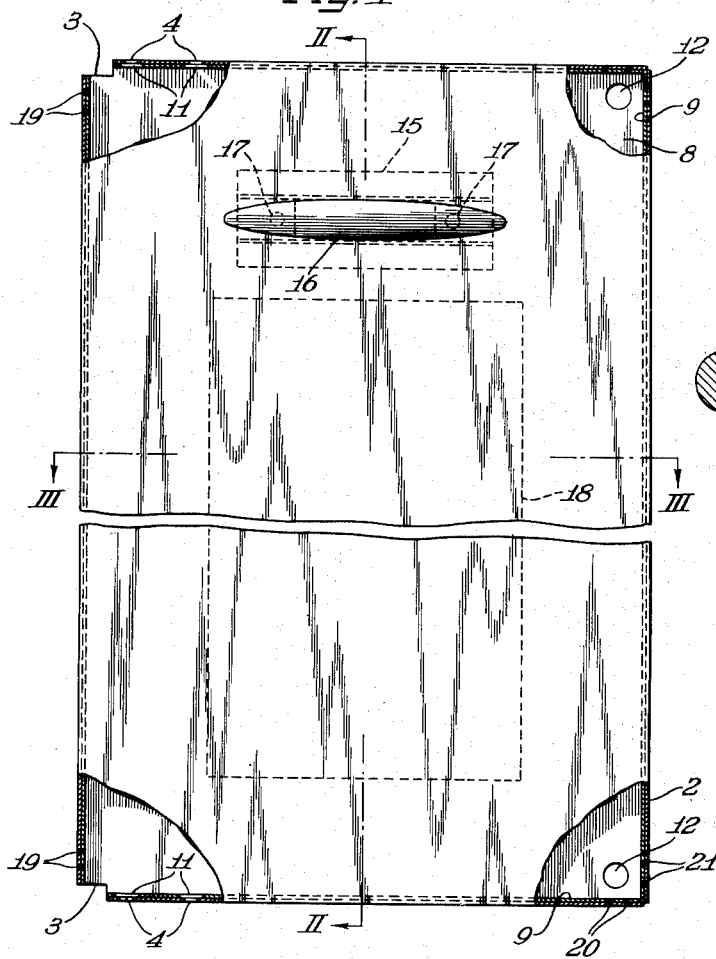
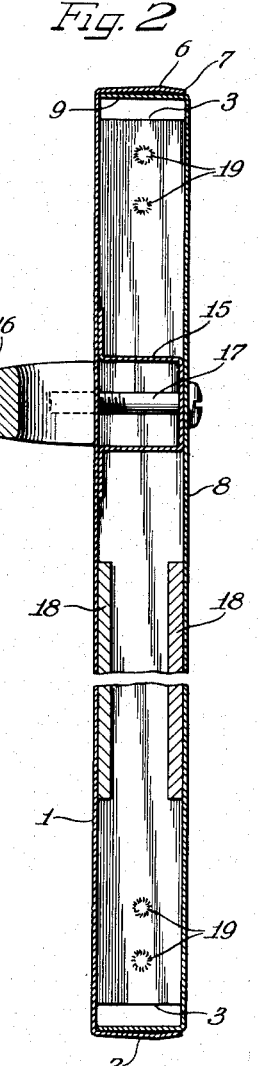
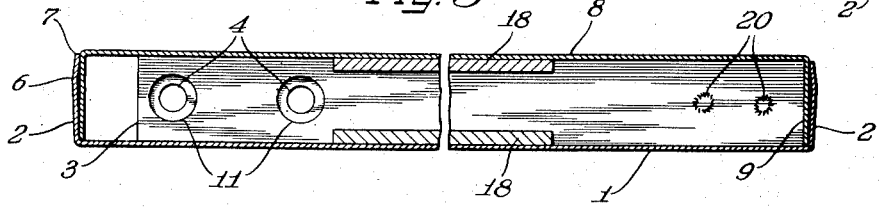
Inventor
Stewart S. Battles &
Louis H. Moos
by  Attys Jan. 12, 1954  S. S. BATTLES ET AL  2,665,781
METALLIC DOOR CONSTRUCTION
Filed Jan. 12, 1949  2 Sheets-Sheet 2
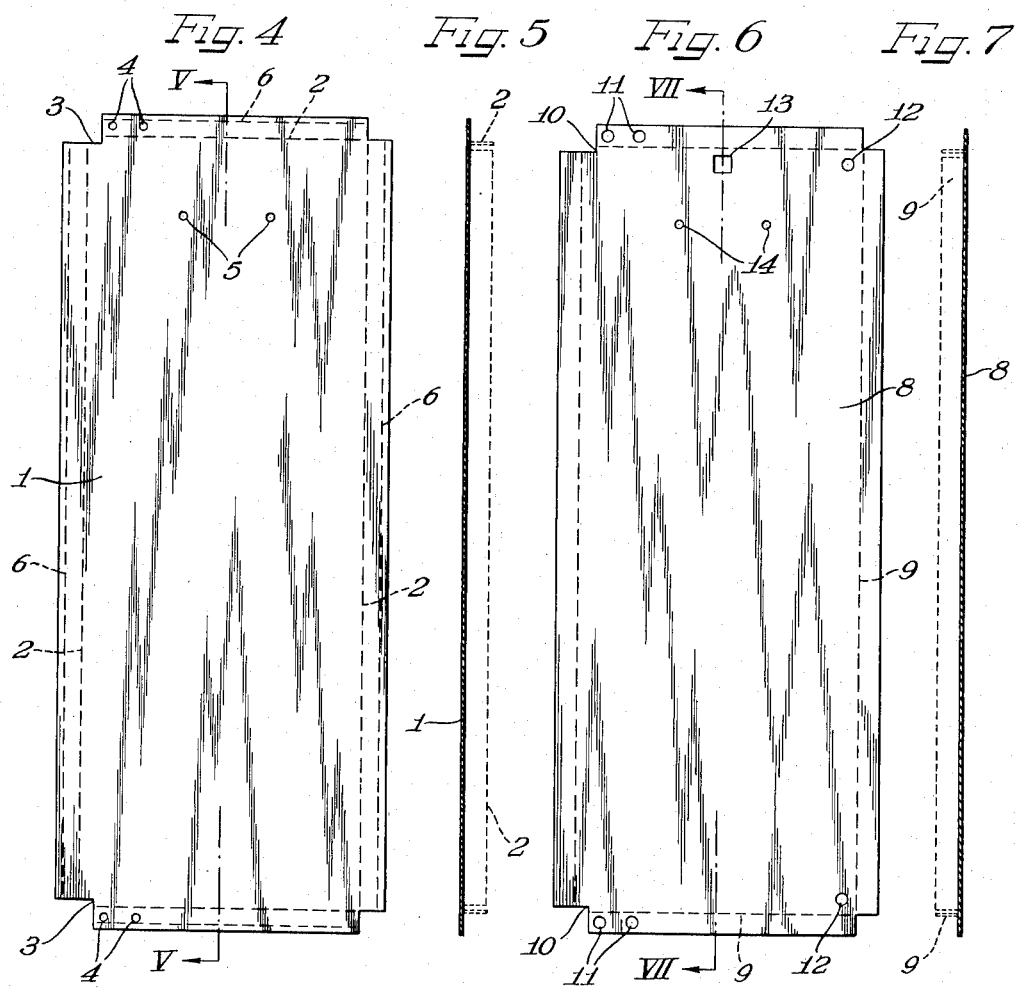
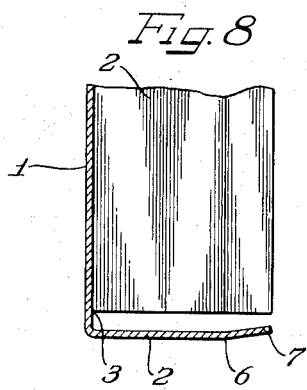
Inventor
Stewart S. Battles &
Louis H. Moos
by Attys Patented Jan. 12, 1954

2,665,781

UNITED STATES PATENT OFFICE 2,665,781

METALLIC DOOR CONSTRUCTION

Stewart S. Battles and Louis H. Moos, Galesburg, Ill., assignors, by mesne assignments, to Admiral Corporation, Chicago, Ill., a corporation Application January 12, 1949, Serial No. 70,583

2 Claims. (Cl. 189—46)

1

This invention relates to improvements in a fabricated panel and method of making the same, and more particularly to a hollow panel customarily made from two pieces of material having flanges therearound and disposed in nested relationship with each other, the resultant fabricated panel being highly desirable for use as a cabinet door, drawer front, or the like, although the invention may have other uses and purposes as will be apparent to one skilled in the art.

Panels of the type in which the instant invention finds embodiment in general consist of a front panel or member having rearwardly turned side and end flanges, and a rear member or liner having forwardly turned side and end flanges, the liner being of such size that its flanges may nest within flanges of the front member, thus comprising a fabricated panel of substantial thickness but hollow interior. In the past, exceeding difficulty has been experienced in the manufacture of panels of this general character in a sufficiently economical manner. This was caused in the main by the fact that the flanges on the outer or front member tended to separate unduly from the flanges of the liner unless an exceedingly expensive welding or brazing operation had been performed to securely lock these flanges together substantially throughout their lengths. With such nested construction, a series of spot-welds lengthwise of any pair of adjacent flanges was impossible because the necessary welding electrode or horn could not be entered inside the nested assembly. Long welds, soldering operations, or the like, were often times prohibitively expensive. Insofar as we are aware, such difficulty was never solved until the advent of the instant invention.

With the foregoing in mind, it is an important object of this invention to provide a fabricated hollow panel in which the overlapping or telescoped flanges of the front member and liner may be simply spot-welded in the corner portions of the fabricated panel with no need of securing the flanges together intermediate the corner portions.

Also an object of this invention is the provision of a fabricated panel made up from a pair of flanged sheets telescoped together, with one or more flanges on the front sheet constructed to resist a tendency to separate from the corresponding flanges of the liner.

It is also a feature of this invention to provide a fabricated panel suitable for use as a cabinet door, a drawer front, or the equivalent, which is of at least as durable a construction as devices of this type heretofore known, but which may be produced far more economically.

Still another object of this invention is the provision of a new and novel method of making a fabricated panel of the character disclosed herein.

Also an object of the invention is the provision of a new and novel method of making a fabricated panel of a pair of flanged sheets reversely telescoped, including the steps of providing openings in the sheets through which overlapping flanges may be welded or equivalently secured together, after which the openings may be closed.

Still a further object of this invention is the provision of a new and novel method of making a fabricated panel including the steps of spot-welding overlapping parts together through openings provided for the securement of accessory fittings, and so shaping overlapping parts to cause inherent resisting of any tendency to separate between welding points.

While some of the more salient features, characteristics and advantages of the instant invention have been above pointed out, others will become apparent from the following disclosures, taken in conjunction with the accompanying drawings, in which—

Figure 1 is a front view of a fabricated panel embodying principles of the instant invention, with parts broken away and parts shown in section;

Figure 2 is an enlarged vertical sectional view of the structure of Fig. 1 taken substantially as indicated by the line II—II of Fig. 1, looking in the direction of the arrows;

Figure 3 is an enlarged plan sectional view of the structure of Fig. 1 taken substantially as indicated by the line III—III of Fig. 1;

Figure 4 is a face view of the front member of a fabricated panel, in which dotted lines indicate where formation bends are made;

Figure 5 is a vertical section through the structure of Fig. 4 taken substantially as indicated by the line V—V of Fig. 4, indicating in dotted lines a step in the formation of the member;

Figure 6 is a face view of the rear member or liner of the fabricated panel;

Figure 7 is a vertical sectional view taken substantially as indicated by the line VII—VII of Fig. 6, indicating by dotted lines steps in the formation of the liner; and Figure 8 is a magnified fragmentary vertical sectional view through the lower portion of the front member after formation has been completed.

As shown on the drawings:

In the illustrated embodiment of this invention there is shown a fabricated panel in the form of a cabinet door, which was selected for purposes of illustration, it being understood that by obviously reshaping the structure, fabricated panel might be used as a drawer front, or in other locations known to those skilled in the art. The front and rear members making up the body of the panel are preferably formed from sheet steel, and by way of example will be so described herein.

The fabricated panel includes a front member or sheet 1 having a rearwardly bent flange 2 on each side and end thereof, so as to provide a substantially open sided box-like structure. At opposite corners along one side thereof, the front member 1 is notched more deeply than required by the respective flanges as indicated at 3—3 to provide room for hinges. In each end flange adjacent the respective notch 3 the front member is also provided with a pair of spaced openings 4 to accommodate hinge securing means. In the upper central portion thereof, the front member is provided with a pair of apertures 5 to accommodate handle holding means.

A very important feature of the construction of the front member is a bend indicated at 6 in one or more of the flanges 2. This bend causes the rear edge portion 7 of the flange to be disposed laterally inwardly beyond the remainder of the flange for frictional engagement with a corresponding flange on the liner element of the panel. The bend, therefore, not only rigidifies and strengthens the flange but also causes such frictional engagement with the corresponding flange on the rear or liner member.

By way of example, and not by way of limitation, it may be mentioned that a bend at an angle of 10° is satisfactory for this purpose. That formation in the flange causes the flange to be inherently capable of resisting any tendency to separate from the corresponding flange on the liner member.

In the illustrated embodiment of the invention we have shown such a bend on each of the four flanges on the front member, but it will be understood that in all cases it will not be necessary to provide the bend on all four flanges, but only upon the flanges subject to the severest usage, and in most cases the bend need only be provided in the side flange opposite the hinges or in that side flange and the top flange.

The rear member or liner comprises a sheet 8 having a forwardly turned flange 9 on each side and end thereof. The flanges 9 are each preferably straight and substantially at 90° to the body of the sheet 8. Of course, the sheet 8 is sufficiently smaller than the front sheet 1 so that the flanges 9 will telescope within the flanges 2 as clearly seen in Figs. 2 and 3. With reference to Fig. 6 it will be seen that the liner is also notched at 10—10 deeper than required by the respective flanges so as to conform with the notches 3—3 in the front member and provide room for hinges. In its end flanges adjacent the notches 10—10, the liner is provided with a pair of openings 11 for hinge mounting elements, and these openings 11 are preferably larger than the corresponding openings 4 in the front member. Adjacent each end thereof on the side opposite the hinge notches, the liner is provided with a relatively large aperture 12 designed to later accommodate a rubber bumper or stop member which would engage a pilaster or flange of a cabinet with which the fabricated panel is associated in a known manner. In its upper central portion, or in any other desirable location, the liner is also provided with a polygonal or square opening 13 to accommodate a holding catch. A pair of spaced apertures 14 are also provided in this liner member to correspond to the apertures 5 in the front member for the accommodation of handle securing means.

On the inside face of the front member a flanged channel type brace 15 is provided opposite a handle 16 held in place by any suitable means, such as bolts 17 passing through the apertures 5 and 14 in the front and rear sections of the panel. It will be noted that added rigidity is given the entire structure by the fact that the liner 8 contacts the bottom of the channel brace 15 as seen in Fig. 2. Also, each panel member 1 and 8 preferably carries on its inner face a vibration dampening element 18 of known construction.

In order to secure the two sections of the fabricated panel together, in accord with the instant invention, it is only necessary to make one or more spot-welds in the corner regions of the panel. In the illustrated instance two such spot-welds are indicated at 19 at the upper and at the lower corner hinge side of the panel, these welds joining the overlapping flanges 2 and 9 together. In that corner region it is not necessary to spot-weld or equivalently secure the end flanges 2 and 9 together because the hinge securing elements passing through the apertures 4 and 11 will accomplish that purpose. On the opposite side thereof, the overlapping end flanges may be secured together by one or more spot-welds indicated at 20 and the overlapping side flanges by one or more spot-welds indicated at 21, at both the upper and lower corner regions.

With the instant construction, no other securing means need be employed to unite the front and rear sections of the fabricated panel. Between the welded areas, it being considered of course that the hinge securing means corresponds to a welded area or point, a flange on the front member will not tend to separate from the corresponding flange on the rear member by virtue of the bend 6. The relatively slight bend 6 in a flange on the front member makes it possible and practical to utilize only spot-weld connections in the very corner portions of the structure. As soon as the rear section is telescoped reversely within the front section, frictional engagement between the edges 7 of the front section flanges is established with the corresponding flanges on the rear section and this frictional engagement will endure throughout the life of the panel in ordinary usage.

In constructing the fabricated panel, it is a simple expedient to blank out a sheet 1 to the shape seen in Fig. 4, and then bend in the respective side and end flanges as indicated by dotted lines in this figure and in Fig. 5, providing the bend at 6 either before or after a flange 2 is turned at right angles to the body of the sheet as may be deemed most desirable.

The rear member or liner is made from a blanked sheet seen in Fig. 6, and the respective flanges 9 turned inwardly as indicated by dotted lines in this figure and Fig. 7.

The two box-like panel sections are then reversely telescoped to the position seen in Fig. 2 and 3. It is then a simple expedient to insert a welding electrode or horn into the opening provided by the hinge notches and provide the spot-welds 19. It is also a simple expedient to insert a welding electrode through the openings 12—12 in the liner and provide the spot-welds 20 and 21. After the welding operations are completed, of course the respective notches and the respective openings are filled up, the notches by hinges, and the openings 12—12 by bumper elements. This method of making the fabricated panel is extremely easy to perform and far more economical than any methods heretofore employed for the making of devices of the same general type as the fabricated panel.

From the foregoing, it is apparent that I have provided a strong, durable, and highly economical fabricated panel of pleasing appearance. It is also apparent that I have provided a new, novel, and extremely economical method of making or manufacturing such a device. Both the structure of the fabricated panel and the practice of the method contribute to the reduction of cost to an extent heretofore not possible.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A fabricated door comprising front and rear members having flanges formed along the edges, said flanges on the rear door extending at an angle normal to the plane of the panel and being planar in formation, the flanges for the front panel extending rearwardly therefrom adapted to telescope over said flanges on the rear panel and being at an angle to the front panel of greater than 90 degrees to a point beyond the midsection in the direction of thickness of the door and inclining at an obtuse angle from the front portion to provide a free edge for engagement with the flange on the rear panel adjacent the panel.

2. A fabricated door comprising front and rear members having flanges formed along the edges, said flanges on the rear door extending at an angle normal to the plane of the panel and being planar in formation, the flanges for the front panel extending rearwardly therefrom adapted to telescope over said flanges on the rear panel and being at an angle to the front panel of greater than 90 degrees to a point beyond the midsection in the direction of thickness of the door and inclining at an obtuse angle from the front portion to provide a free edge for engagement with the flange on the rear panel adjacent the panel, and reinforcing means for said door comprising a U shaped beam extending and bridging the space between the front and rear panels, and handle means including a handle disposed on said front panel and screw means extending through said rear panel and said beam into said handle means to hold said panels, handle and beam securely together.

STEWART S. BATTLES.
LOUIS H. MOOS.

References Cited in the file of this patent
UNITED STATES PATENTS

| Number | Name | Date |
|---|---|---|
| 1,003,784 | Parish | Sept. 19, 1911 |
| 1,247,250 | Field | Nov. 20, 1917 |
| 1,898,417 | Woehler | Feb. 21, 1933 |
| 2,010,520 | Kiekert | Aug. 6, 1935 |
| 2,142,438 | Faiveley | Jan. 3, 1939 |
| 2,196,781 | Saino et al. | Apr. 9, 1940 |
| 2,253,384 | Lown et al. | Aug. 19, 1941 |
| 2,297,609 | Clark et al. | Sept. 29, 1942 |
| 2,335,329 | Whitehead | Nov. 30, 1943 |
| 2,391,436 | Miskella | Dec. 25, 1945 |
| 2,556,099 | Myer | June 5, 1951 |
| 2,579,157 | Price, Sr. | Dec. 18, 1951 |